United States Patent
Harran et al.

(10) Patent No.: US 10,169,116 B2
(45) Date of Patent: Jan. 1, 2019

(54) IMPLEMENTING TEMPORARY MESSAGE QUEUES USING A SHARED MEDIUM

(71) Applicant: International Business Machines Corporation, Armonk, NY (US)

(72) Inventors: Richard M W Harran, Southampton (GB); Matthew W. Leming, Romsey (GB); Colin C. Paice, Chandlers Ford (GB); Pete Siddall, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 457 days.

(21) Appl. No.: 14/918,647

(22) Filed: Oct. 21, 2015

(65) Prior Publication Data
US 2017/0116055 A1    Apr. 27, 2017

(51) Int. Cl.
*G06F 9/54*    (2006.01)
(52) U.S. Cl.
CPC .................................. *G06F 9/546* (2013.01)
(58) Field of Classification Search
CPC ............. G06F 9/546; G06F 9/54; G06F 9/544
See application file for complete search history.

(56) References Cited

U.S. PATENT DOCUMENTS

| | | |
|---|---|---|
| 5,887,168 A | 3/1999 | Bahls et al. |
| 6,862,595 B1 | 3/2005 | Elko et al. |
| 7,127,507 B1 * | 10/2006 | Clark .................... H04L 43/045 709/224 |
| 7,937,433 B1 | 5/2011 | Kumar |
| 8,667,505 B2 | 3/2014 | Woods et al. |
| 2013/0086199 A1 | 3/2013 | Frank et al. |

OTHER PUBLICATIONS

IBM Knowledge Center, "Dynamic and Model queues," https://www-01.ibm.com/support/knowledgecenter/SSFKSJ_7.5.0/com.ibm.mq.pro.doc/q003140_.htm?lang=en, Last Updated Friday, Sep. 25, 2015, Printed on Oct. 21, 2015, pp. 1-1.
Hu et al., "Per-Flow Queueing by Dynamic Queue Sharing," IEEE.org, IEEE Xplore Digital Library, IEEE Standards, IEEE Spectrum, http://ieeexplore.ieee.org/xpl/articleDetails.jsp?tp=&arnumber=421577 . . . , Printed on May 21, 2015, pp. 1-2.
(Continued)

*Primary Examiner* — Umut Onat
(74) *Attorney, Agent, or Firm* — Erik K. Johnson

(57) ABSTRACT

A computer system defines a list structure on the shared medium wherein the list structure has multiple lists; and provides a list which is allocated to a single queue manager in which message entries are located which belong to multiple shared temporary dynamic queues (STDQs) created by the single queue manager, wherein the message entries are located by reference to a key which determines a message entry's position in the list, the list including: a list header which can be partitioned for multiple current STDQs by assignment of key ranges to message entries belonging each current STDQ; and a list control entry which holds information about the assignment of key ranges to the multiple current STDQs and shares the information with other queue managers using the STDQs, wherein the list control entry is updated by the single queue manager when an STDQ is created or deleted.

17 Claims, 9 Drawing Sheets

(56) References Cited

OTHER PUBLICATIONS

Hu et al., "Dynamic queuing sharing mechanism for per-flow quality of service control," www.ietdl.org, Published in IET Communications, Received on Jun. 29, 2009, Revised on Oct. 8, 2009, The Institution of Engineering and Technology 2010, vol. 4, Iss. 4, pp. 472-483.

Mell et al., "The NIST Definition of Cloud Computing," National Institute of Standards and Technology, U.S. Department of Commerce, Special Publication 800-145, Sep. 2011, pp. 1-7.

* cited by examiner

US 10,169,116 B2

IMPLEMENTING TEMPORARY MESSAGE QUEUES USING A SHARED MEDIUM

BACKGROUND

The present invention relates to implementing temporary message queues, and more specifically, to implementing temporary message queues using a shared medium.

Middleware messaging products are available that allow user applications to communicate using messages without having to know the complexities of the underlying hardware and software platform. Applications communicate using an application programming interface (API) issuing such calls as PUT to put a message onto a queue and GET to get a message from a queue. (The terms "get" and "put" may be generally interchangeably with the terms "read" and "write", respectively.)

An example of such a middleware messaging product is IBM's WebSphere MQ® (IBM and WebSphere MQ are trademarks of International Business Machines Corporation registered in multiple jurisdictions worldwide).

SUMMARY

According to a first aspect of the present invention there is provided a method for implementing temporary message queues using a shared medium at a coupling facility shared between multiple systems each having a queue manager handling messages from the system's applications, the method carried out at the coupling facility comprising: defining a list structure on the shared medium wherein the list structure has multiple lists; providing a list which is allocated to a single queue manager in which message entries are located which belong to multiple shared temporary dynamic queues (STDQs) created by the single queue manager, wherein the message entries are located by reference to a key which determines a message entry's position in the list, the list including: a list header which can be partitioned for multiple current STDQs by assignment of key ranges to message entries belonging each current STDQ; and a list control entry which holds information about the assignment of key ranges to the multiple current STDQs and shares the information with other queue managers using the STDQs, wherein the list control entry is updated by the single queue manager when an STDQ is created or deleted.

According to a second aspect of the present invention there is provided a method for implementing temporary message queues using a shared medium at a coupling facility shared between multiple systems each having a queue manager handling messages from the system's applications, the method carried out at a queue manager comprising: allocating a list at a list structure of a coupling facility to the queue manager, wherein message entries are located on the list which belong to multiple shared temporary dynamic queues (STDQs) created by the queue manager, wherein the entries are located by reference to a key which determines a message entry's position in the list; creating an STDQ including obtaining an assigned key range in the list for message entries belonging to the STDQ; and updating a list control entry of the list with information regarding the assignment of key ranges to the created STDQ enabling sharing of the information with other queue managers using the STDQ.

According to a third aspect of the present invention there is provided a system for implementing temporary message queues using a shared medium at a coupling facility shared between multiple sharing systems, the system including a processor and a memory configured to provide computer program instructions to the processor and a queue manager comprising: a list header allocating component for allocating a list at a list structure of a coupling facility to the queue manager, wherein message entries are located on the list which belong to multiple shared temporary dynamic queues (STDQs) created by the queue manager, wherein the entries are located by reference to a key which determines a message entry's position in the list; an STDQ allocation component for creating an STDQ including obtaining an assigned key range in the list for message entries belonging to the STDQ; and an updating component for updating a list control entry of the list with information regarding the assignment of key ranges to the created STDQ enabling sharing of the information with other queue managers using the STDQ.

According to a fourth aspect of the present invention there is provided a computer program product for implementing temporary message queues using a shared medium at a coupling facility shared between multiple systems each having a queue manager handling messages from the system's applications, the computer program product comprising a computer readable storage medium having program instructions embodied therewith, the program instructions executable by a processor to cause the processor to: define a list structure on the shared medium wherein the list structure has multiple lists; provide a list which is allocated to a single queue manager in which message entries are located which belong to multiple shared temporary dynamic queues (STDQs) created by the single queue manager, wherein the message entries are located by reference to a key which determines a message entry's position in the list, the list including: a list header which can be partitioned for multiple current STDQs by assignment of key ranges to message entries belonging each current STDQ; and a list control entry which holds information about the assignment of key ranges to the multiple current STDQs and shares the information with other queue managers using the STDQs, wherein the list control entry is updated by the single queue manager when an STDQ is created or deleted.

According to a fifth aspect of the present invention there is provided a computer program product for implementing temporary message queues using a shared medium at a coupling facility shared between multiple systems each having a queue manager handling messages from the system's applications, the computer program product comprising a computer readable storage medium having program instructions embodied therewith, the program instructions executable by a processor to cause the processor to: allocate a list at a list structure of a coupling facility to the queue manager, wherein message entries are located on the list which belong to multiple shared temporary dynamic queues (STDQs) created by the queue manager, wherein the entries are located by reference to a key which determines a message entry's position in the list; create an STDQ including obtaining an assigned key range in the list for message entries belonging to the STDQ; and update a list control entry of the list with information regarding the assignment of key ranges to the created STDQ enabling sharing of the information with other queue managers using the STDQ.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Figure 1:
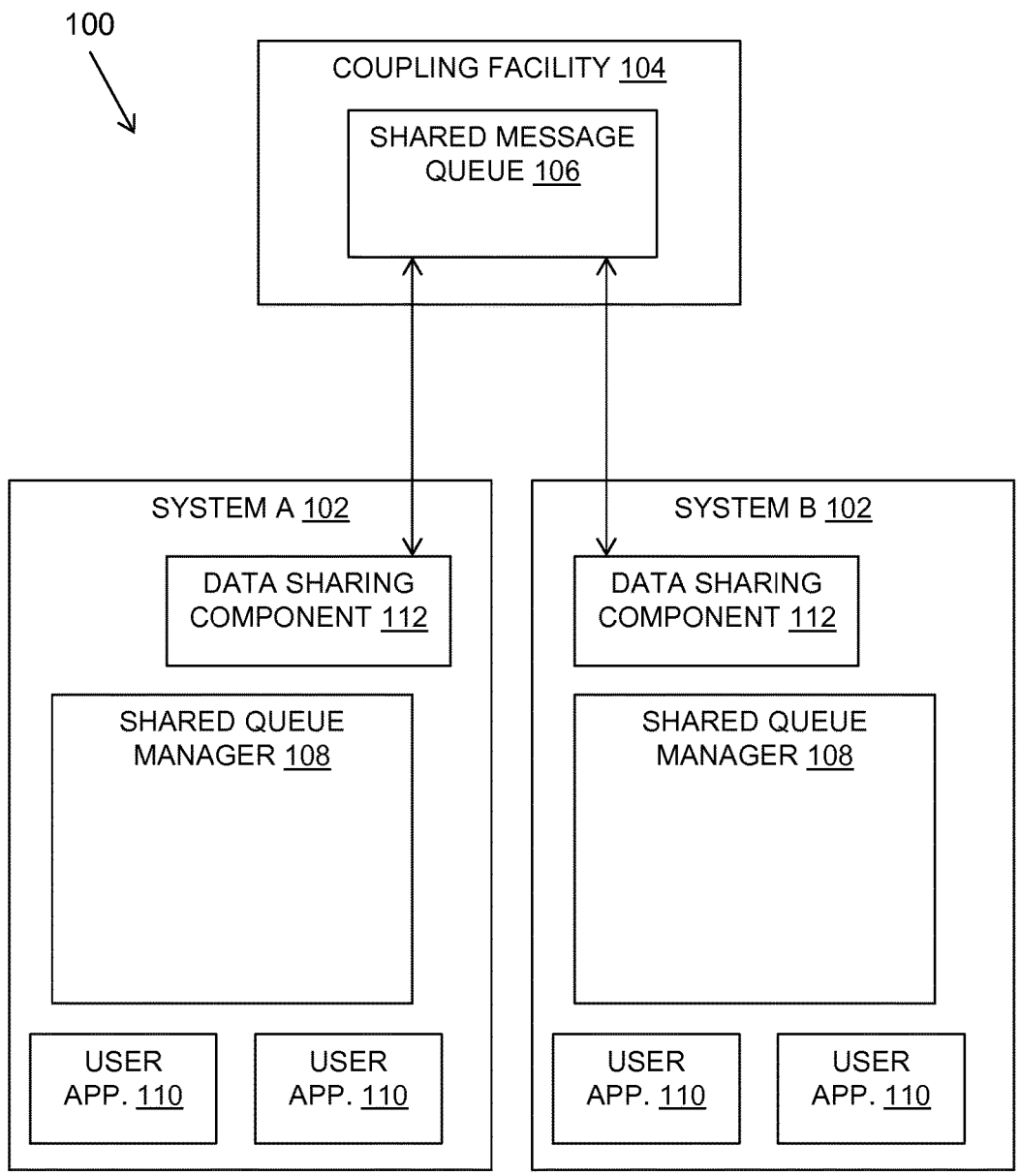
FIG. 1 is a block diagram of a system including a shared message queue as known in the prior art.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Dynamic queues are created when an application issues a queue open request and are created based on a model queue that provides a template queue definition. Model queues specify whether the dynamic queue is to be permanent or temporary. Permanent queues survive application and queue manager restarts, whereas temporary queues are lost on restart.

Dynamic queues are used for applications that do not require queues to be retained after the application has terminated. They are also used by applications that require replies to messages to be processed by another application. Such applications can dynamically create a reply-to queue by opening a model queue, creating a dynamic queue and supplying its name in the "ReplyToQ" field of the message descriptor structure of the request messages. A server processing the request will then place the reply message on the reply-to queue. The application may process the reply and close the reply-to queue.

Temporary Dynamic Queues (TDQ) are known which have a limited life-span, no recovery requirements and are typically used as a destination for response messages in a requester-server pattern of queue use. TDQs conventionally are not implemented as shared queues because typically a new one is created for every request/response interaction.

A shared queue is a type of local queue with messages that can be accessed by one or more queue managers that are in a queue-sharing group (QSG). Shared queues are held by a coupling facility (CF) and are accessible by any queue manager in the queue-sharing group. Each shared queue in a queue-sharing group must have a name that is unique within that group. In a QSG configuration, shared queues provide a communication mechanism between a requester on one system in a queue-sharing group and a server on another. Shared queue implementation involves the use of a database as a repository for the mapping of queue name to list header number.

U.S. Pat. No. 6,862,595 discloses a method and apparatus for implementing a shared message queue using a list structure. A put list is defined comprising a sequence of list entries, each of which corresponds to a message in the queue and has an associated list entry key. Each list entry key corresponding to an uncommitted message falls within an uncommitted key range defining an uncommitted portion of the put list, while each list entry key corresponding to a committed message falls within a committed key range defining a committed portion of the put list. To write a message to the queue, a list entry is added to the put list having a list entry key within the uncommitted key range.

The shared queue as described in U.S. Pat. No. 6,862,595 is a pre-defined queue in a queue-sharing group and enables the use of list-processing capabilities of the coupling facility to implement a message queue that is shared by queue managers residing on different systems across a sysplex.

Referring to FIG. 1, a general configuration of a system complex (sysplex) 100 as known in the prior art is shown including a queue-sharing group (QSG).

Sysplex 100 comprises a plurality of systems 102 (an exemplary two of which, System A and System B, are shown), each of which is connected to a coupling facility (CF) 104. The CF 104 may maintain one or more shared permanent message queues 106 as described in U.S. Pat. No. 6,862,595. As is conventional, each system 102 comprises one or more processors and an operating system (not separately shown) and may constitute either a separate physical machine or a logical partition of a logically partitioned machine. Similarly, coupling facility 104 may constitute either a separate physical machine or a logical partition of a logically partitioned machine.

Within each system 102, user applications 110 perform sequences of operations, referred to herein as units of work (UOWs), on shared message queues 106 via a shared queue manager (SQM) 108 resident on that system. Shared queue managers 108 on different systems 102 that share the same message queue 106 are referred to herein as a queue-sharing group (QSG). In one embodiment, each shared queue manager 108 in turn interacts with the coupling facility via a data sharing component 112 of the operating system.

User applications 110 on a system 102 interact with the shared queue manager 108 on that system via a series of Message Queue Interface (MQI) calls, the most important of which are MQPUT (to put a message onto a message queue 106) and MQGET (to get a message from a message queue 106). In response to such a call, shared queue manager 108 issues a call to the data sharing component 112 to invoke a requested system service to communicate with the coupling facility 104.

In the presently described method and system, a message queue usage is provided in which an API call of MQOPEN is used to open a model queue and create a temporary dynamic queue.

The presently described method and system provide an artifact in the form of a Shared Temporary Dynamic Queue (STDQ). In contrast to the known form of shared queue described above, a STDQ has lower creation and deletion costs and co-exists on a single coupling facility (CF) list header with other STDQs thereby reducing the CF resources used. The described STDQs have no recovery requirements;

therefore, any database operations for creation and deletion are removed from queue creation and deletion time.

Multiple STDQs may exist on a single CF list header. Every entry on a list header has a different primary key. Multiple STDQs on a single list header each use primary keys from a different range of possible values. The structure of the primary key provides some features of the messaging application programming interface. This may reduce the number of list headers required.

To be suitable for this purpose, the CF list structure allows efficient implementation of message-queuing semantics. The following is a subset of the required semantics provided for illustration:

A message should be uniquely identified.

When a message is written (put) to a queue by a Unit of Work (UOW), it should not be visible to other units of work anywhere in the queue-sharing group (QSG) until the message is committed. The uncommitted message however is available to the unit of work that wrote it.

Committed messages should be maintained in proper sequence. Committed messages eligible to be read should be in priority sequence, from highest priority to lowest priority. If there are multiple messages with the same priority, then the set of messages should be maintained in order of arrival sequence within designated priority.

Messages read from a queue should be unavailable to other UOWs in the QSG. When a committed message is read (got) by a unit of work, then no other unit of work anywhere in the queue-sharing group can read the same message. If the read is committed, the message should be deleted from the CF list structure so that it is not visible to another unit of work.

Messages read that are backed out should be reinserted into their proper committed positions with respect to both priority and time of arrival.

Committing messages for a UOW should be efficient.

In the described method and system, a queue manager in a QSG ensures a CF list header is reserved ahead of time for use with STDQs. Subsequent list headers for use with STDQ may be allocated ahead of time if the number of in-use STDQs increases.

In the described method and system, a naming convention is used for the STDQs to construct a system generated name which removes the need for the use of a central shared repository for maintaining a mapping of queue names.

A mechanism to pack STDQs on to a single CF list header while maintaining the message delivery sequence semantics of "Priority" or "First In First Out" is also described.

Figure 2:
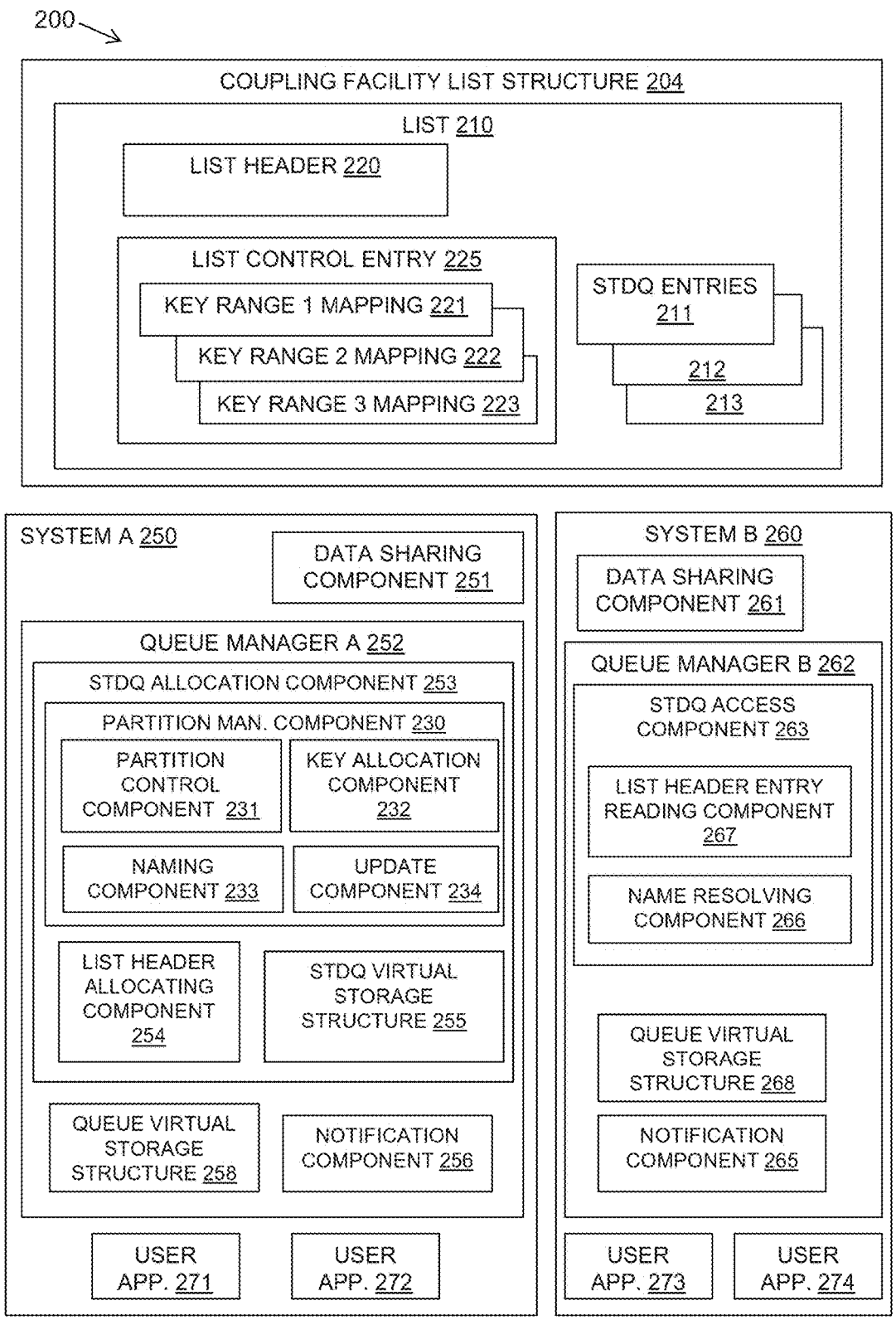
FIG. 2 is a block diagram of an example embodiment of a system in accordance with the present invention.

Referring to FIG. 2, an example embodiment of the described system 200 is shown.

Multiple systems (for example, System A 250, System B 260) may use a coupling facility list structure 204 to form a queue-sharing group. Each system 250, 260 and the coupling facility may each include at least one processor, a hardware module, or a circuit for executing the functions of the described components which may be software units executing on the at least one processor. Memory may be configured to provide computer instructions to the at least one processor to carry out the functionality of the components.

Each system 250, 260 enables user applications 271, 272, 273, 274 to perform units of work on created STDQs currently defined on a list 210 at the coupling facility list structure 204. Each system 250, 260 includes a queue manager 252, 262 resident on the system for handling the units of work of the system's user applications. Each queue manager 252, 262 interacts with the coupling facility list structure 204 via a data sharing component 251, 261 of the system 250, 260.

Each queue manager 252, 262 may include a conventional queue virtual storage structure 258, 268 which is a catalogue of all queue names and corresponding queue attributes. This includes all private (non-shared) queues, and a cache of all shared queues. Each queue manager 252, 262 may also include a notification component 256, 265 for sending and receiving notifications regarding the creation and deletion of STDQs for updating the queue virtual storage structure's catalogue.

The coupling facility list structure 204 is provided on the shared medium wherein the list structure 204 has multiple lists 210. In common implementations, a list structure 204 generally includes 512 lists headers and one list header is required to define one list 210. In FIG. 2, a single list 210 is shown for illustration purposes.

Each list 210 is allocated to a queue manager, in this example, the list 210 shown in FIG. 2 is allocated to queue manager A (QMA) 252. Message entries 211-213 are located on the list 210 which belong to one of multiple current STDQs created by the queue manager to which the list 210 is allocated. Message entries 211-213 are located by reference to a key that determines an entry's position in the list 210.

A list 210 has a list header 220 which can be partitioned for multiple current STDQs by assignment of key ranges to message entries 211-213 belonging to each current STDQ and arranging for messages for a queue to be assigned a committed key in the range corresponding with the assigned queue. Further details of partitioning are provided below. The list header 220 of a list 210 is owned by the queue manager A (QMA) 252 to which the list 210 is allocated.

A list 210 includes a list control entry 225 that holds information about the assignment of key ranges to the multiple current shared temporary dynamic queues (STDQs) and shares the information with other queue managers, for example, queue manager B (QMB) 262, using the STDQs. The list control entry 225 is updated by queue manager A (QMA) 252 when an STDQ is created or deleted. The list control entry 225 includes key range mappings to STDQs 221-223 for reference by the queue managers.

The list control entry 225 is updated by the queue manager A (QMA) 252 to which the list 210 is allocated and read by other queue managers B (QMB) 262. FIG. 2 shows a queue manager A (QMA) 252 to which the list 210 is allocated with an STDQ allocation component 253 showing the functionality of the queue manager to which the list 210 is allocated. The second queue manager B (QMB) 262 shown in FIG. 2 includes an STDQ access component 263 showing the functionality of a queue manger in using a STDQ on a list 210 for which it is not the allocated queue manager. It should be understood that each queue manager in a queue-sharing group may include both the functionality of an STDQ allocation component 253 and an STDQ access component 263 and may use these components depending on its current role.

The STDQ allocation component 253 of queue manager A (QMA) 252 may include the following components.

A list header allocating component 254 provides pre-allocated list headers for use with STDQs ahead of time and for a long period, so the cost of allocation and recordation is amortized across the life of many STDQs. As the available key ranges 221-223 in a pre-allocated list header 220 are allocated for use with STDQs, further list headers may be allocated by the list header allocating component 254.

An STDQ virtual storage structure 255 may be provided assigned to the queue manager A (QMA) 252 to contain the state of STDQs created by the queue manager A (QMA) 252 and to which key ranges they are assigned. This is a map in virtual storage, which includes all the list headers reserved for the allocation of STDQs by this queue manager.

The STDQ allocation component 253 of queue manager A (QMA) 252 includes a partition management component 230 for handling new STDQs. The partition management component 230 includes a key allocation component 232 for allocating key ranges 221-223 for new STDQs and a partition control component 231 for controlling the partitioning of the list header 220.

A naming component 233 may also be provided at the partition management component 230 for allocating a constructed name for a new STDQ according to a naming convention as described further below. The partition management component 230 may also include an update component 234 for updating the list control entry 225 for the list header 220 to which the new STDQ is allocated and for updating the STDQ virtual storage structure 255. Similar components and functionality may be included for deleting an STDQ and de-allocating the key range for the STDQ.

A list 210 and its list header 220 are owned by or allocated to a single queue manager A (QMA) 252 which is solely responsible for updates in the list control entry 225. The list control entry 225 describes the STDQs 211-213 using the list header 220, the keys they occupy, and uniqueness values (the timestamp in exemplar naming convention below ensures uniqueness through time). The list control entry 225 is used to communicate list header use between members of the queue-sharing group systems 250, 260.

Other queue managers B (QMB) 262 will recognize that a list header 220 has been reserved by a peer for use with STDQs 211-213. A given STDQ name entered into the list control entry 225 can be used to rapidly establish whether the queue is valid from information held in the list control entry 225. STDQs 211-213 have naming conventions described below to facilitate this.

The queue manager B (QMB) 262 may include various components for receiving and processing STDQ updates. The queue manager B (QMB) 262 may include an STDQ access component 263 including a list control entry reading component 267 for reading the list control entry 225 of a list header 220 owned by another queue manager 252 in the queue-sharing group. The STDQ access component 263 may also include a name resolving component 266 for resolving a received STDQ name to determine the location of a STDQ.

When the queue manager A (QMA) 252 allocates a new STDQ to the list header 220. The creation of the new STDQ may be communicated via the use of its name to other queue managers B (QMB) 262, for example, as received by their applications for use. The queue manager A (QMA) 252 may also communicate details of the new STDQ by updating the queue virtual storage structure 258 at the allocating queue manager 252 with the constructed name of the new STDQ. The owner queue manager 252 may use the notifying component 256 for notifying other queue managers 262 of the new STDQ name so they can in turn update their queue virtual storage structure 268.

Figure 3:
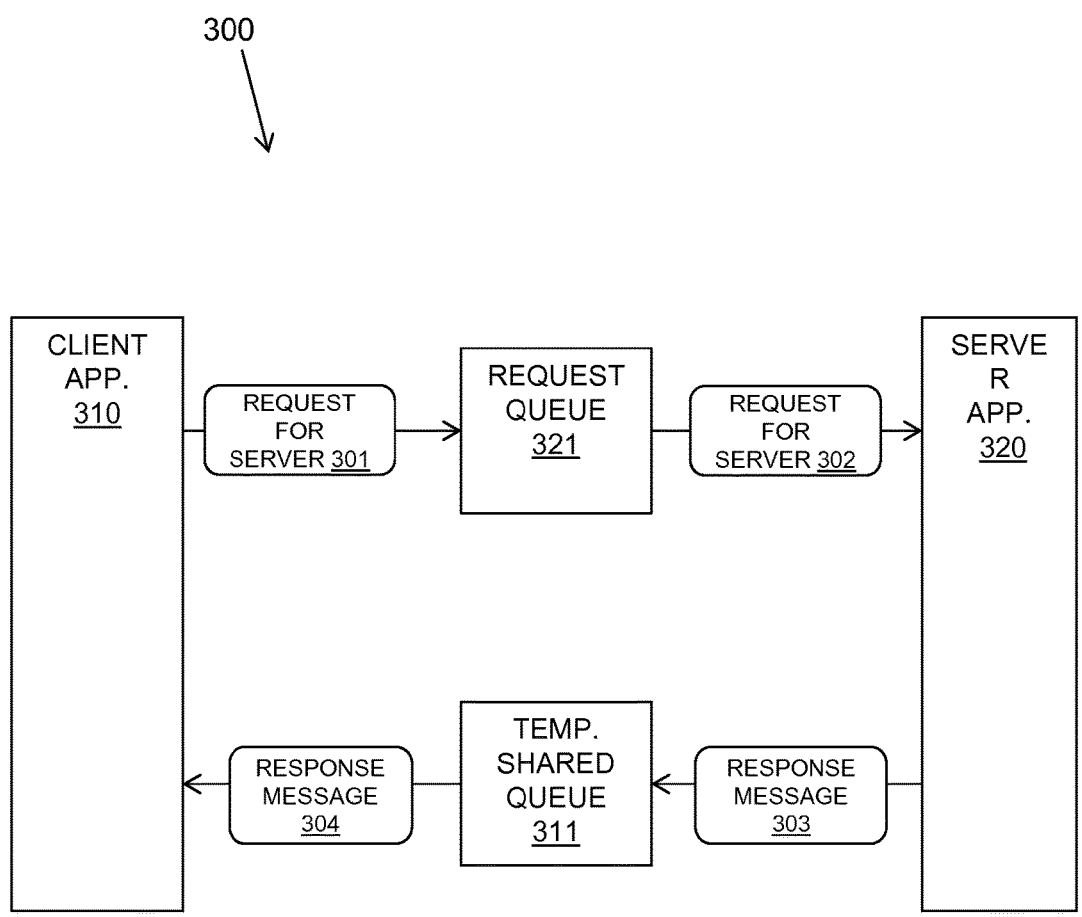
FIG. 3 is a schematic diagram showing the use of a temporary shared queue in in accordance with the present invention.

Referring to FIG. 3, an example embodiment of a client server pattern 300 as used by messaging applications is shown with the described STDQ functionality.

A server application 320 may have an associated request queue 321. Specially formed messages placed on the request queue 321 provide instructions to the server application 320.

An instance of a client (requesting) application 310 may start up and may create a new STDQ instance 311 to hold responses from the server application 320. An STDQ 311 provides a light-weight queue structure to be used as a so-called "ReplyToQueue".

The client application 310 builds a request 301 for the server application 320, which contains the name of the STDQ 311 to be used for responses and places it on the server's request queue 321. The server application 320 receives 302 the message and carries out the requested action.

The server application 320 builds a response message 303, and places it on the ReplyToQueue 311. The client application 310 receives 304 the response from the ReplyToQueue 311. There may be multiple response messages to be received, i.e. steps 303 and 304 may be iterated. After all responses are received, the ReplyToQueue 311 may be deleted.

Figure 4A:
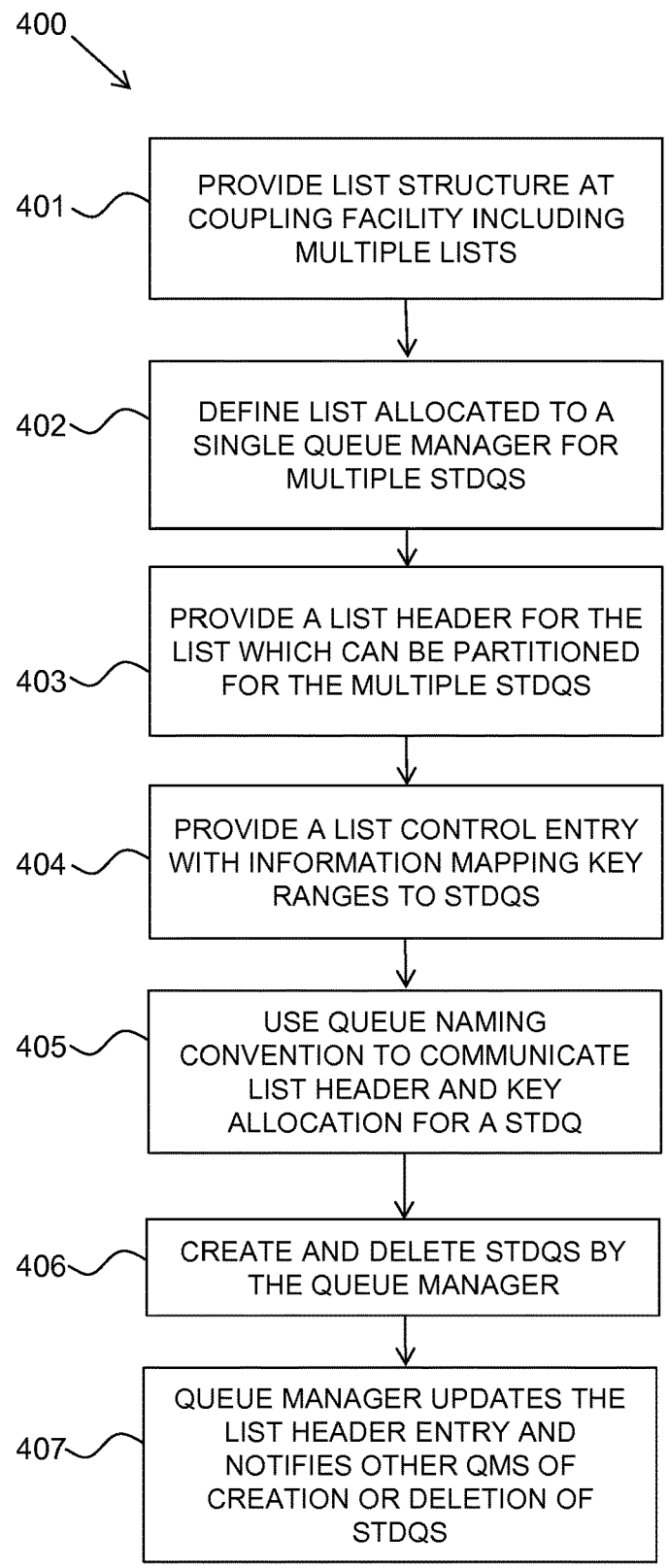
FIGS. 4A and 4B are a flow diagram of example embodiments of aspects of a method in accordance with the present invention.
Figure 4B:
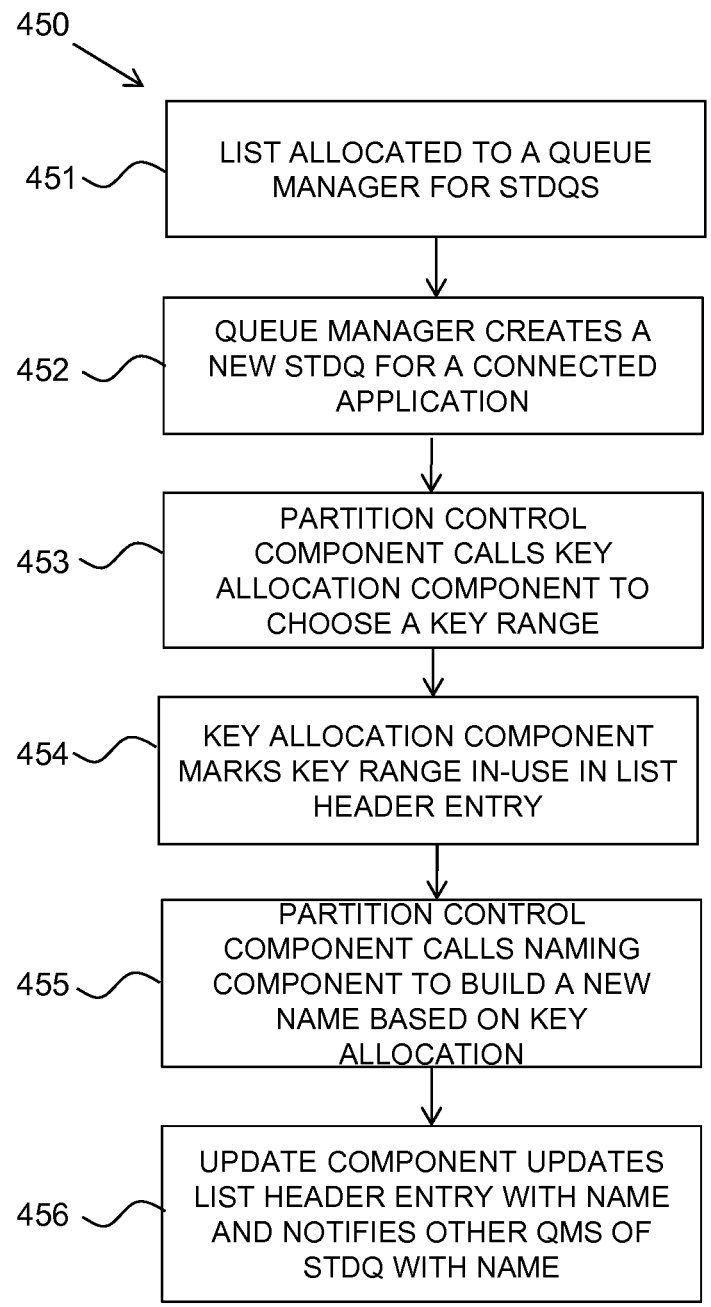

FIGS. 4A and 4B show flow diagrams 400, 450 show example embodiments of aspects of the described method.

Referring to FIG. 4A, a list structure is defined 401 at a coupling facility which provides a shared medium between multiple systems each having a queue manager handling messages from the system's applications. The list structure includes multiple lists each with a list header.

A list is defined 402 which is allocated to a single queue manager in which message entries are located which belong to multiple shared temporary dynamic queues (STDQs) created by the single queue manager. The message entries are located by reference to a key which determines a message entry's position in the list. The allocated queue manager controls the list header partitioning and allocation of key ranges to STDQs.

The list includes 403 a list header which can be partitioned for multiple current STDQs by assignment of key ranges to message entries belonging to each current STDQ. A list header can be partitioned into multiple STDQs through assignment of a range of keys to each STDQ and arranging for messages for a specific STDQ to be assigned a committed key in the range corresponding with its assigned queue.

A list control entry is provided 404 in the list which holds information and mappings about the assignment of key ranges to the multiple current STDQs and shares the information with other queue managers using the STDQs. The list control entry is updated by the allocated queue manager for describing the list and the STDQs using it and sharing this information with the queue-sharing group.

A queue naming convention is used 405 to generate a name for an STDQ which communicates the location of the STDQ including the list header location and key allocation for the STDQ. The queue naming convention includes an identifier such as a timestamp to resolve confusion with other past queue instances.

The name of an STDQ is communicated within the queue-sharing group at STDQ creation and deletion time. This may also be communicated by a message including the STDQ name sent to an application, for example, a request message indicating a queue for a response message.

STDQs may be created and deleted 406 as required by the allocated queue manager for its applications. The allocated queue manager may update 407 the list control entry to reflect STDQ creation or deletion and may notify other queue managers in the queue-sharing group of the STDQ creation or deletion.

Referring to FIG. 4B, a method carried out by a queue manager is described with reference to the components shown in FIG. 2.

A list at a list structure of a coupling facility is allocated 451 to a queue manager, and message entries are put and got from the list which belong to multiple shared temporary dynamic queues (STDQs) created by the queue manager. The message entries are located by reference to a key which determines a message entry's position in the list.

The queue manager to whom the list is allocated may create 452 a new STDQ. This may be in response to a request from an application to the queue manager where the application is connected (for example, the request may be from an application in the form of the client application 310 in FIG. 3).

The partition management component 230 at the queue manager 252 of FIG. 2 may carry out the following method.

The partition control component 231 may call 453 the key allocation component 232 to choose a key range for a new STDQ. The key allocation component 232 may mark 454 the assigned key range as "in-use" in the bit strip of the list control entry 225.

The partition control component 231 may call 456 the update component 234 to update the list control entry 225 and, optionally, notify other queue managers in the queue-sharing group of the new STDQ with the constructed name.

The partition control component 231 may call 456 the update component 254 to update the list control entry 225 and, optionally, notify other queue managers in the queue-sharing group of the new STDQ with the constructed name.

Another queue manager receiving a constructed STDQ name in a request message may query the list control entry 225 for the list header encoded in the name to validate that the key range encoded in the name is marked as in-use in the bit strip of the list control entry.

The following describes an example embodiment of a partitioning convention as carried out by the list header. This uses message-queuing semantics as outlined above.

Partitioning is by the first byte of the committed key.

Keys 0xF0 . . . to 0xFF . . . are reserved for uncommitted put. This matches existing key use and avoiding this key range for committed keys simplifies co-existence of the described STDQs with existing mechanisms for recovery and searching on shared queues.

The partitioned list has two options for partitioning, the first of which allows for priority delivery sequence of messages, and the second of which only allows first in-first out (FIFO) delivery. The general design does not preclude mixing the two schemes on a single list.

When priority delivery is supported, a range of 10 digits in the first byte is taken for each STDQ on the list header. This range starts on a multiple of 10, even when priority STDQs are mixed with FIFO STDQs. So, the first STDQ on the list header would have committed key-range 0x00 . . . to 0x09 . . . , and the second would have committed key-range 0x0A . . . to 0x13 . . . , etc. This allows a maximum of 23 STDQs on a single list header.

When FIFO-only delivery is supported, a range of 1 digit in the first byte is taken for each STDQ on the list header. So the first STDQ on the list would have committed key-range 0x0000 . . . to 0x00FF . . . , and the second would have committed key-range 0x0100 . . . to 0x01FF . . . , etc. This allows a maximum of 240 STDQs on a single list header.

Uncommitted keys are indicated by a first byte in the range xF0 through xFF with the STDQ specific partition of the committed key range encoded in a lower-significance byte position of the uncommitted key.

Each list header has a unique list control entry associated with it used to communicate control information about the use of that list header between queue managers.

In known shared queues, a component is provided which is referred to as a list header queue control (LHQC) that is used to hold queue attributes. The LHQC component may be modified to the function of the list control entry described herein of controlling key range assignment for the STDQ partitions. Each of the 240 possible STDQ key assignments is represented by a bit in a bit strip in the list control entry.

Allocating a FIFO STDQ would mark one bit in use, allocating a PRIORITY STDQ would mark ten bits (starting on a 10 boundary) in use. Allocation proceeds left to right on the bit strip using a first-fit algorithm for either these single, or aligned groups of 10, bits. Since a list header is owned by a single queue manager, only that queue manager updates the list header queue entry bit strip when STDQs are allocated and de-allocated and no serialization mechanism is needed between queue managers.

A queue naming convention is chosen which conveys the location of the STDQ from the allocating queue manager (for example, the client application 310 in FIG. 3) to the queue manager where the server is running (the server application 320 in FIG. 3).

One possible convention is SYSTEM.qqqq.Snn.Lmmm.Kixx.timestamp. All the upper-case characters and all the period characters "." are literals. These serve two purposes: firstly, they allow any STDQ name from to be distinguished from a system generated name with a different meaning; and secondly, they may provide visual cues to the meaning of the name.

qqqq: is the 4 character queue manager name where the STDQ is allocated;

S: is the literal character "S" indicating that the next two characters encode the structure number;

nn: is a 2 character internal identifier for a coupling facility structure;

L: is the literal character "L" indicating that the next three characters encode the list header number;

mmm: is a 3 digit coupling facility list header number in the range 1 to 512;

K: is the literal character "K" indicating that the next three characters encode the key partition;

i: is either F or P, indicating whether the queue is FIFO so using a single key, or Priority, so using 10;

xx: is a 2 character representation of the starting key on the list header used by the STDQ; and timestamp: is an 8 character timestamp to ensure uniqueness over time.

As an example of this referring to FIG. 3, the server application 320 may receive a request message 302 indicating a reply is to be put on queue 311. The queue name is provided, for example, as: SYSTEM.QM03.S01.L012.KFD7.C5E3C540E2C9D4D4.

The queue manager where the server application 320 is running can decode this to the Structure (01), List header (012), and Key range (single key starts with x'D7') to use for the response message. The timestamp is used in conjunction with information sent at allocation time notification to be sure this is the correct instance of a queue. The timestamp is needed because the request message 302 may have been on a request queue for a considerable period of time, during which the owning queue manager may have been stopped and restarted and all its STDQs would have been removed.

The described method and system use a constructed system generated name which adheres to a defined naming convention and therefore, an application is not allowed to chose a name for a temporary queue.

The STDQ name includes the queue manager name, and that means it satisfies the requirement for unique queue names without serializing across the QSG. When a queue SYSTEM.QM1.Sxxx is created on QM1, it is known that no-one is creating a queue with the same name on QM2, because QM2 system generated names all start SYSTEM.QM2.

There is a known mechanism used by shared queues to make the queue control information available to all queue managers without each having to access the shared data directly. This is shown in FIG. 2 as the queue virtual storage structure 258, 268 and notification component 256, 265 of the queue managers 252, 262 which enable each queue manager to hold a cached view of the data. This view might be slightly out of date, and there are various scenarios in which a queue may have been changed by another queue manager, for example, a new queue has been created and has not yet been cached; a queue has been deleted, and the deletion has not yet been cached; and a queue has been deleted, the deletion has not yet been cached, and a new queue has been created which re-uses the same structure number and list header number.

Some of these scenarios may be covered by accessing the list control entry, using partitions in the list header, using the deletion bit-strip, and the timestamp in the name. However, there may be operations where access is needed to a STDQ without knowing the name. These may include displaying multiple queues using a wild-carded name that can match STDQ names, and recovery. In such operations, the queue virtual storage structure 258, 268 may be used to view the cached view of the data.

Messaging systems have the concept of triggering where the arrival of a configurable number of messages on an application queue causes a "trigger event message" to be generated and placed on a so called "initiation queue". It is common practice to configure queues for an event to be generated when the "first" message is put, or when "every" message is put. It is less common to configure for an event when a particular "depth" is reached (for example, trigger when 105 messages have arrived). For shared queues, CF technology is used to monitor the committed key range for the arrival of any message and to translate this into "trigger first".

This will work for STDQs by inspecting the arriving message's key to determine which STDQ it is destined for. Monitoring for get-wait or trigger-first can be done by monitoring the entire relevant key-range to cover all STDQs that have current monitoring requirements. Secondary filtering is required, so this is inefficient if there is an STDQ in the range that has messages arriving, but does not have any monitoring requirement. Trigger-depth is not supported for STDQs.

There are likely to many temporary dynamic queues in use concurrently because they typically only live for the duration of a request/response interaction. A shared queue architecture typically associates a maximum of 512 list headers and so shared queues with a CF structure would be too small if each temporary dynamic queue required its own list header. The described method addresses this by allowing multiple STDQs to use a single list header so raising the number for a single structure by more than two orders of magnitude.

Conventional shared queue implementations involve the use of a database as a repository for the mapping of queue name to list header number. The database repository of conventional implementations ensures that a queue name is unique. The described method and system do not require the use of a database repository due to the naming convention which includes the queue manager name so there is no intersection between the set of possible names for the STDQs allocated on one queue manager and the set of possible names for STDQs allocated on any other queue manager. The naming convention also communicates the structure number.

The pattern of use of temporary dynamic queues is typically to hold a few non-persistent (non-recoverable) messages for a short period of time. The implementation of temporary dynamic queues should therefore be equally lightweight in performance terms, which is not compatible with a durable database repository update. This is addressed by the described method by providing a lightweight allocation mechanism in which STDQs created on a queue manager are allocated from resources (specifically list headers and key ranges in list headers) that are already owned by that queue manager, with no sharing required.

Conventionally allocating coupling facility lists is an expensive operation because it involves updates to both the structure table and queue table maintained in a database. In the described method and system, a queue manager preallocates a list header to itself to use in the lightweight allocation mechanism and it is kept and reused for a long time. Further list headers may be pre-allocated when further demand is anticipated. As a list header is kept and reused for a long time, pre-allocation is not required to be lightweight. However, pre-allocation can be made to be more lightweight than allocating a list header for a specific queue in a conventional implementation.

Figure 5:
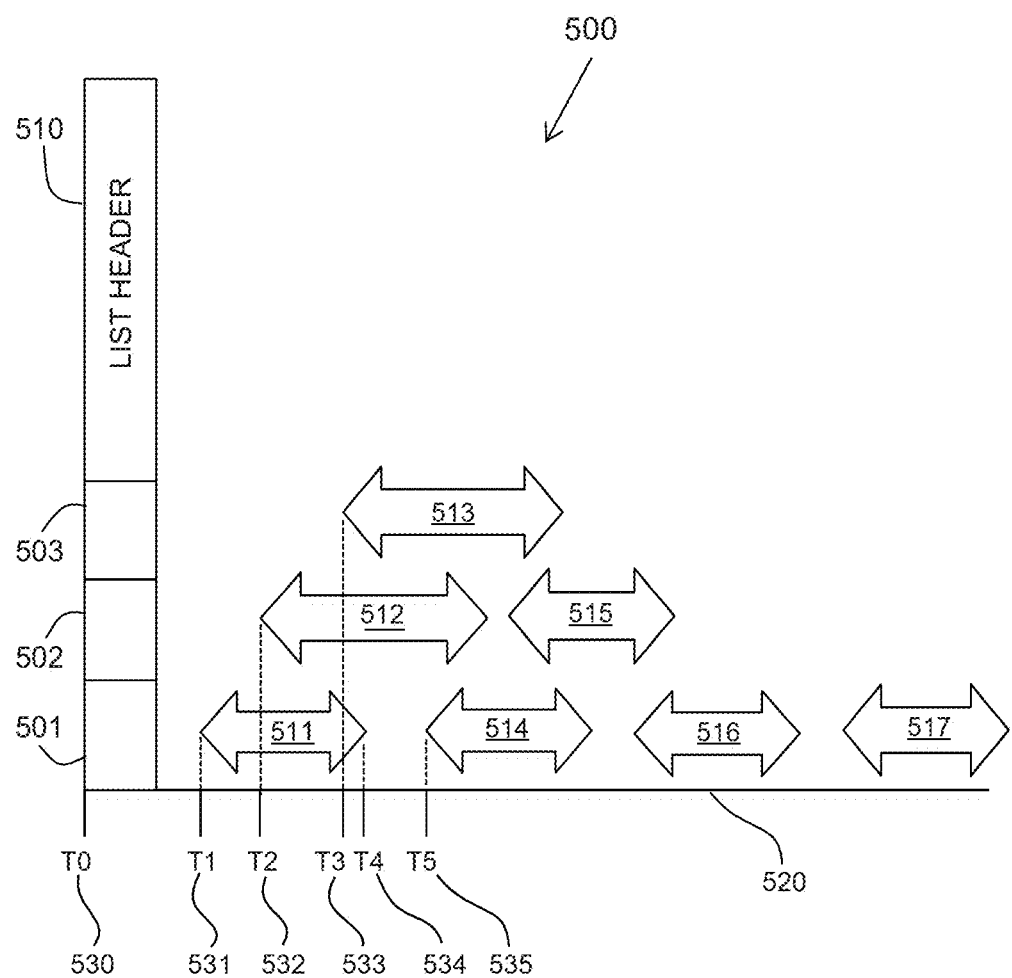
FIG. 5 is schematic diagram of an example embodiment of key partitioning of a shared queue in accordance with an aspect of the present invention.

Referring to FIG. 5, a schematic diagram 500 shows a list header 510 with key ranges 501, 502, 503 reserved for STDQs. STDQs 511-517 are allocated against key ranges 501-503 as available against a time line 520. As this is a single list header 510, all the allocations and deletions are done on the same queue manager.

The time line 520 shows at time T0 530 a list header 510 being reserved for use by the queue manager as an anchor for STDQs.

At time T1 531, an STDQ 511 is created by a client application.

At time T2 532, a second STDQ 512 is required. The first STDQ key range 501 is still in use, so a second key range 502 within the same list header 510 is used.

At time T3 533, a third STDQ 513 is required. The first STDQ key range 501 and the second STDQ key range 502 are still in use, so a third key range 503 within the same list header 510 is used.

At time T4 534, the first STDQ 511 is deleted by the original client application.

At time T5 535, another STDQ 514 is required. The first key range 501 on the list 510 is now available and can be re-used for this STDQ 514.

The PUT(ENABLE|DISABLE) and GET(ENABLE|DISABLE) operations are removed for STDQs. This means the coupling facility list authority is not used for the list, and a PUT(DISABLE) operation on one STDQ cannot impact use of another.

The present invention may be a system, a method, and/or a computer program product. The computer program product may include a computer readable storage medium (or media) having computer readable program instructions thereon for causing a processor to carry out aspects of the present invention.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge devices. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or device. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
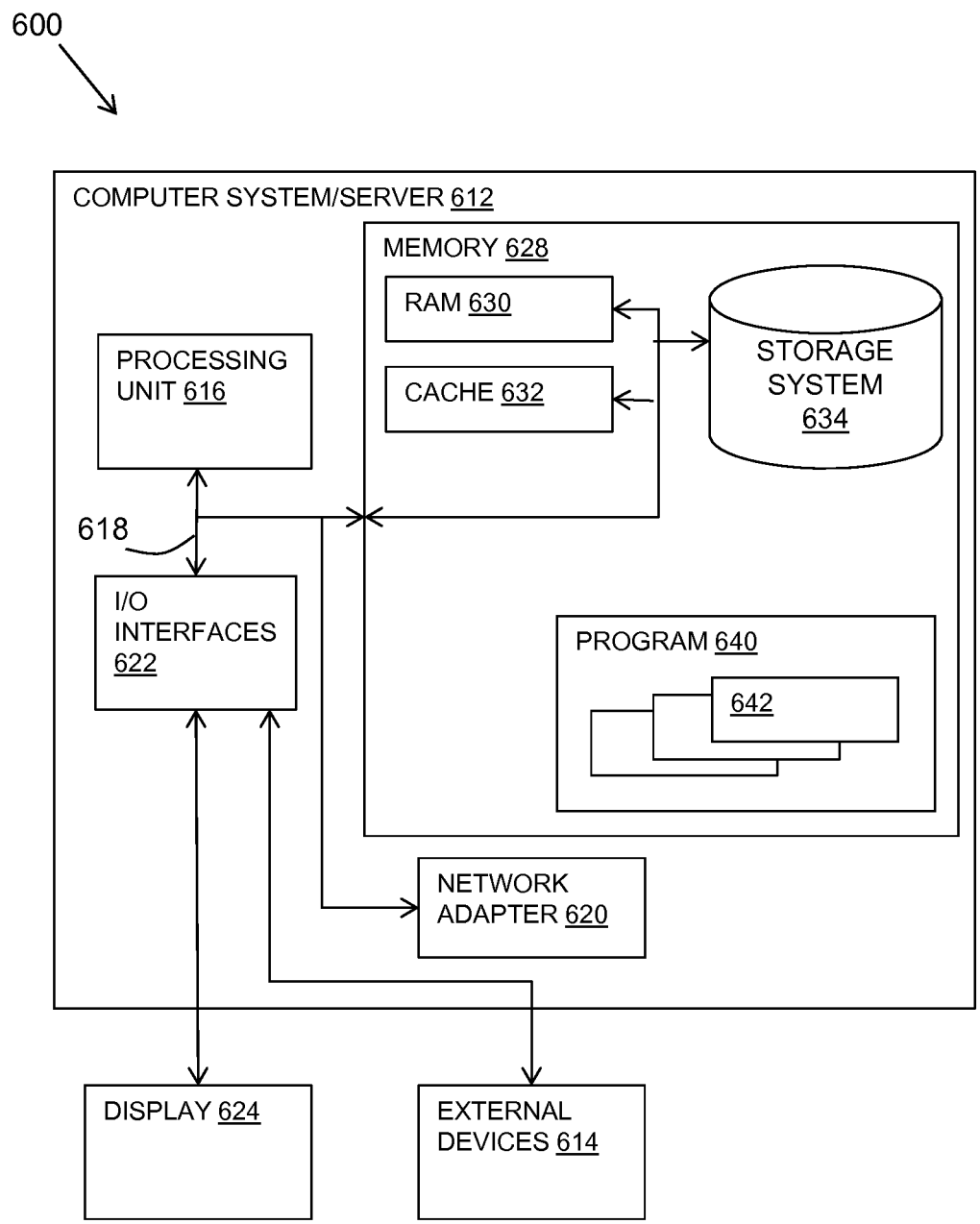
FIG. 6 is a block diagram of an embodiment of a computer system or cloud server in which the present invention may be implemented.

Referring now to FIG. 6, a schematic of an example of computer system or server is shown which may be implemented as a cloud computing node 600.

Cloud computing node 600 is only one example of a suitable cloud computing node and is not intended to suggest any limitation as to the scope of use or functionality of embodiments of the invention described herein. Regardless, cloud computing node 600 is capable of being implemented and/or performing any of the functionality set forth hereinabove.

In cloud computing node 600 there is a computer system/server 612, which is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 in cloud computing node 600 is shown in the form of a general-purpose computing device. The components of computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

Figure 7:
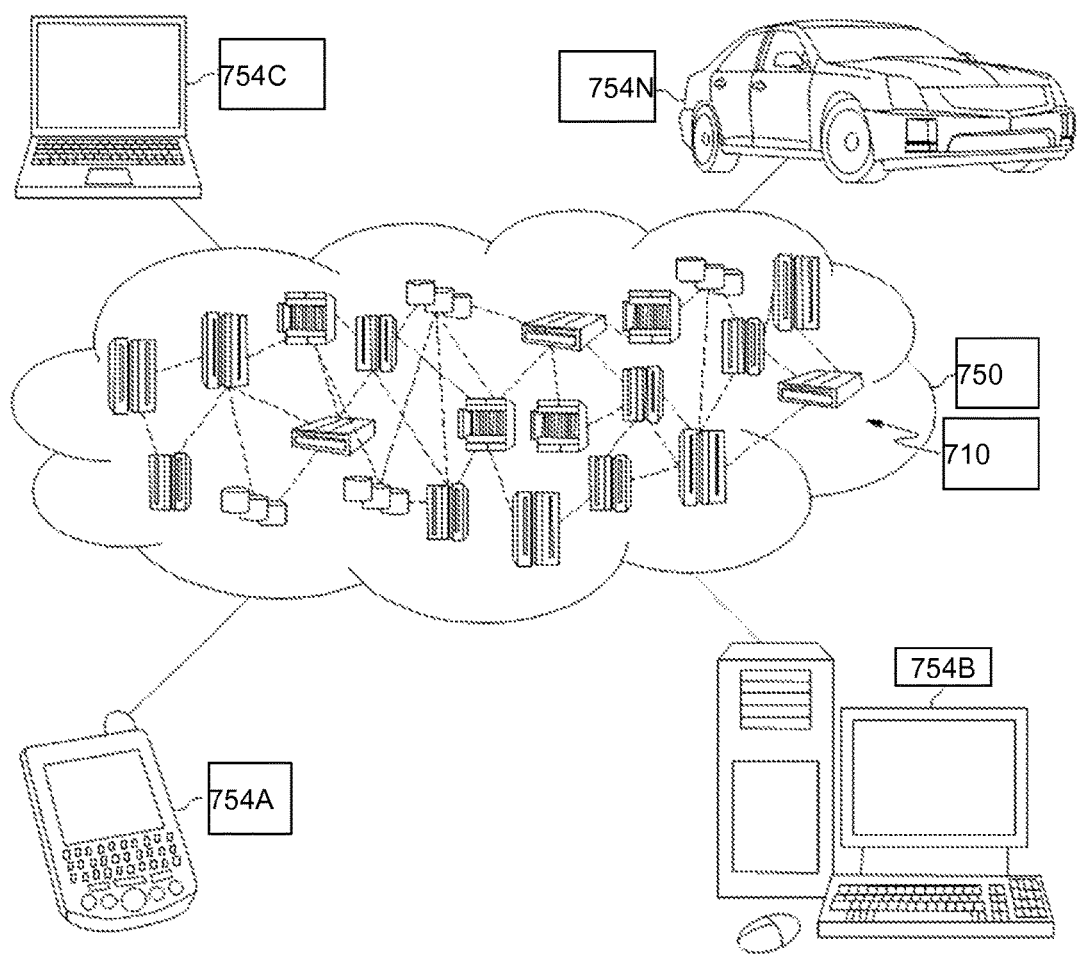
FIG. 7 is a schematic diagram of a cloud computing environment in accordance with an embodiment of the invention.

Referring now to FIG. 7, illustrative cloud computing environment 750 is depicted. As shown, cloud computing environment 750 comprises one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
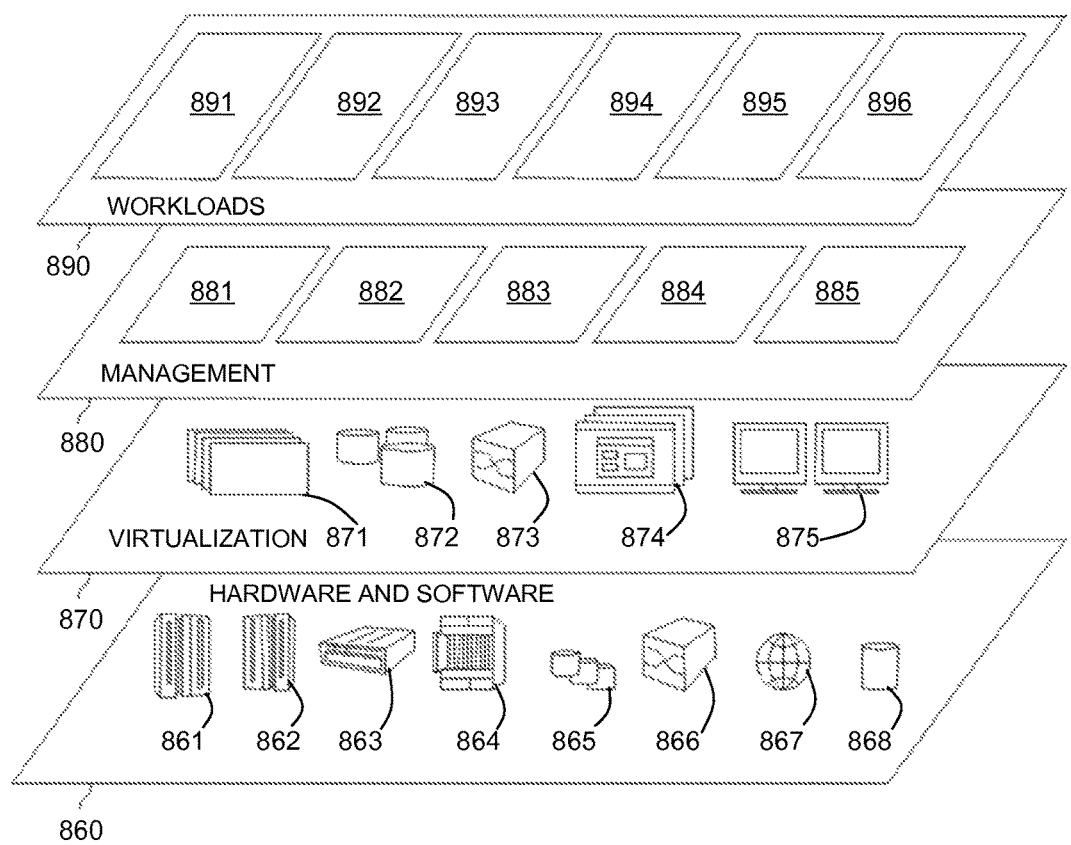
FIG. 8 is a diagram of abstraction model layers of a cloud computing environment according to an embodiment of the present invention.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; and messaging processing 895 including as described herein; and other functionality 896 as required.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A method for implementing temporary message queues using a shared medium at a coupling facility shared between multiple systems each having a queue manager handling messages from the system's applications, the method carried out at the coupling facility comprising:

defining a list structure on the shared medium wherein the list structure has multiple lists;

providing a list which is allocated to a single queue manager in which message entries are located which belong to multiple shared temporary dynamic queues (STDQs) created by the single queue manager, wherein the message entries are located by reference to a key which determines a message entry's position in the list, the list including:

a list header which can be partitioned for multiple current STDQs by assignment of key ranges to message entries belonging each current STDQ; and a list control entry which holds information about the assignment of key ranges to the multiple current STDQs and shares the information with other queue managers using the STDQs, wherein the list control entry is updated by the single queue manager when an STDQ is created or deleted, wherein the list control entry includes a name of an STDQ which is in accordance with a queue naming convention and includes: an indication of the list structure, an indication of the single queue manager, a list header number, a start key on the list header, and a unique identifier for the STDQ; and sending a message from a first system of the multiple systems to a second system of the multiple systems based on the list.

2. The method of claim 1, wherein the name further includes: an indication of a priority or first in first out (FIFO) policy for treatment of message entries of the STDQ.

3. The method of claim 1, wherein the list control entry controls partitioning of the list header to allow for priority delivery sequence of messages and/or first in first out (FIFO) delivery of messages.

4. The method of claim 1, wherein the list control entry re-assigns a key range to a new STDQ when the key range has been de-assigned from a deleted STDQ.

5. A method for implementing temporary message queues using a shared medium at a coupling facility shared between multiple systems each having a queue manager handling messages from the system's applications, the method carried out at a queue manager comprising:

allocating a list at a list structure of the coupling facility to the queue manager, wherein message entries are located on the list which belong to multiple shared temporary dynamic queues (STDQs) created by the queue manager, wherein the entries are located by reference to a key which determines a message entry's position in the list;

creating an STDQ including obtaining an assigned key range in the list for message entries belonging to the STDQ;

updating a list control entry of the list with information regarding the assignment of key ranges to the created STDQ enabling sharing of the information with other queue managers using the STDQ;

generating a name of the created STDQ which is in accordance with a queue naming convention and includes: an indication of the list structure, an indication of the queue manager; a list header number; a start key on the list header; and a unique identifier for the STDQ; and sending a message from a first system of the multiple systems to a second system of the multiple systems based on the list.

6. The method of claim 5, wherein the name further includes: an indication of a priority or first in first out (FIFO) policy for treatment of message entries of the STDQ.

7. The method of claim 5, including communicating a STDQ name for use by other queue managers using the STDQ and thereby communicating the location of the STDQ and enabling queue managers to establish validity of an STDQ from the list control entry.

8. The method of claim 5, including:
providing a virtual storage structure corresponding to the list control entry containing a state of multiple STDQs assigned to which key ranges.

9. The method of claim 5, including:
receiving a request for a new STDQ from an application;
calling the list control entry to assign a key range to the new STDQ;
building a name for the new STDQ using a queue naming convention based on the assigned key range; and
updating the list control entry with the name of the new STDQ.

10. The method of claim 5, including:
pre-allocating a list header to the queue manager for use with STDQs; and
allocating subsequent list headers for use with STDQs as the number of in-use STDQs increases.

11. A system for implementing temporary message queues using a shared medium at a coupling facility shared between multiple sharing systems, the system including a processor and a memory configured to provide computer program instructions to the processor and a queue manager comprising:

a list header allocating component for allocating a list at a list structure of a coupling facility to the queue manager, wherein message entries are located on the list which belong to multiple shared temporary dynamic queues (STDQs) created by the queue manager, wherein the entries are located by reference to a key which determines a message entry's position in the list;

an STDQ allocation component for creating an STDQ including obtaining an assigned key range in the list for message entries belonging to the STDQ;

an updating component for updating a list control entry of the list with information regarding the assignment of key ranges to the created STDQ enabling sharing of the information with other queue managers using the STDQ;

a naming component for generating a name of the created STDQ which is in accordance with a queue naming convention and includes: an indication of the list structure, an indication of the queue manager; a list header number; a start key on the list header; and a unique identifier for the STDQ; and a forwarding component for sending a message from a first system of the multiple sharing systems to a second system of the multiple sharing systems based on the list.

12. The system of claim 11, wherein the name further includes: an indication of a priority or first in first out (FIFO) policy for treatment of message entries of the STDQ.

13. The system of claim 11, wherein the queue manager communicates a STDQ name for use by other queue managers using the STDQ and thereby communicating the location of the STDQ and enabling queue managers to establish validity of an STDQ from the list control entry.

14. The system of claim 11, wherein the queue manager includes:
a virtual storage structure corresponding to the list control entry containing a state of multiple STDQs assigned to which key ranges.

15. The system of claim 11, wherein the queue manager includes:
the STDQ allocation component receiving a request for a new STDQ from an application;
a key allocation component for calling the list control entry to assign a key range to the new STDQ;
the naming component building a name for the STDQ using a queue naming convention based on the assigned key range; and
the updating component updating the list control entry with the name of the STDQ.

16. The system of claim 11, wherein the queue manager wherein the list header allocating component is for allocating a list header to the queue manager for use with STDQs and allocating subsequent list headers for use with STDQs as the number of in-use STDQs increases.

17. The system of claim 11, wherein a user application communicates the name of an STDQ in a message to a receiving application to enable the receiving application to determine the location of the STDQ.

* * * * *